US010343624B2

(12) United States Patent
Luciew

(10) Patent No.: US 10,343,624 B2
(45) Date of Patent: Jul. 9, 2019

(54) BRACKET ASSEMBLIES AND VEHICLES USING THE SAME

(71) Applicant: Ford Global Technologies LLC, Dearborn, MI (US)

(72) Inventor: Simon Luciew, Ardeer (AU)

(73) Assignee: Ford Global Techologies, LLP, Dearborn, MI (US)

( * ) Notice: Subject to any disclaimer, the term of this patent is extended or adjusted under 35 U.S.C. 154(b) by 45 days.

(21) Appl. No.: 15/886,174

(22) Filed: Feb. 1, 2018

(65) Prior Publication Data

US 2018/0281703 A1     Oct. 4, 2018

(30) Foreign Application Priority Data

Mar. 29, 2017   (CN) .......................... 2017 1 0196308

(51) Int. Cl.
| | |
|---|---|
| *B60J 9/00* | (2006.01) |
| *B60R 13/04* | (2006.01) |
| *F16B 5/12* | (2006.01) |
| *F16B 2/10* | (2006.01) |

(52) U.S. Cl.
CPC ............... *B60R 13/04* (2013.01); *F16B 2/10* (2013.01); *F16B 5/123* (2013.01); *F16B 5/128* (2013.01)

(58) Field of Classification Search
CPC .. B60R 13/04; F16B 2/10; F16B 5/132; F16B 5/128
See application file for complete search history.

(56) References Cited

U.S. PATENT DOCUMENTS

| | | | |
|---|---|---|---|
| 5,228,736 A | 7/1993 | Dutton | |
| 5,301,913 A | 4/1994 | Wheatley | |
| 5,426,832 A * | 6/1995 | Doussot | .................... F16B 2/22 24/543 |
| 5,827,023 A | 10/1998 | Stull | |
| 5,873,688 A | 2/1999 | Wheatley | |
| 5,967,719 A | 10/1999 | Davenport | |
| 6,547,311 B1 | 4/2003 | Derecktor | |
| 6,568,740 B1 | 5/2003 | Dimmer | |
| 6,827,532 B1 | 12/2004 | Nix | |
| 7,001,122 B2 | 2/2006 | Bommarito | |
| 7,037,057 B1 | 5/2006 | Wheatley | |
| 7,549,828 B2 | 6/2009 | Smith | |
| 8,613,477 B2 | 12/2013 | Tyler et al. | |
| 2008/0014041 A1 | 1/2008 | Randazzo | |
| 2010/0230571 A1* | 9/2010 | Sharkey | ................. B60N 3/101 248/311.2 |

FOREIGN PATENT DOCUMENTS

EP         2607570 A1 *  6/2013   .......... E04F 10/0611

* cited by examiner

*Primary Examiner* — Lori L Lyjak
(74) *Attorney, Agent, or Firm* — Vichit Chea; Kolitch Romano LLP

(57) ABSTRACT

Bracket assemblies to connect a first part and a second part where the two parts form an angle with one another including a first articulation member that includes a first joint portion with a first pivot connection that is coupled with the first part, the first articulation member also including a second joint portion having a second pivot connection that is coupled with the second part. In some examples, there is a second articulation member that is pivotably connected to the first articulation member and the first part.

20 Claims, 13 Drawing Sheets

BRACKET ASSEMBLIES AND VEHICLES USING THE SAME

RELATED APPLICATION

This application claims the benefit of Chinese Patent Application No.: CN 201710196308.1 filed on Mar. 29, 2017, the entire contents thereof being incorporated herein by reference.

FIELD

The present disclosure relates generally to bracket assemblies in a vehicle, and in particular, to bracket assemblies having at least one articulation member for attaching or affixing a rail trim to a load box of a vehicle.

BACKGROUND

Rail trims may be attached to sidewalls of a load box of a vehicle such as a truck for decoration or styling purpose. It can be challenge to attach the rail trim to the sidewall of the load box because of their relative position and their sizes. The inventor has recognized that there is need to for a bracket that allow a wider range of installation angle during an assemble process and thus provide flexibility and improve the efficiency in production environments.

SUMMARY

The present disclosure is directed to a bracket assembly to connect a first part and a second part. The bracket assembly includes a first articulation member that includes a first joint portion with a first pivot connection that is coupled with the first part. The first articulation member also includes a second joint portion having a second pivot connection that is coupled with the second part. By including articulating members, the first part and second part can move and adjust to their correct positions in the assembly process, making installation of the parts easier.

In one embodiment, the first joint portion of the bracket assembly includes a first socket that is connected with a first pivot, and the second joint portion of the bracket assembly includes a second socket that is connected with a second pivot. The two sockets open to a direction different from each other. The bracket assembly also includes a connection plate that includes the second pivot and connects with the second socket. The first pivot can be an integral portion of the first part.

In another embodiment, the first pivot is a separated piece to be connected with the first part via a fastener or a heat staking.

In another embodiment, the bracket assembly may include a third joint portion that is pivotably connected with the first joint portion of the first articulation member, and a fourth joint portion that is connected with a first pivot. In this example, pivotable movement between the first and the third joint portions varies a length of the bracket along a length direction. The third joint portion of the second articulation member includes a third socket and a fourth socket opened at a direction different from the third socket. The first joint portion of the first articulation member includes a first head that is connected with the third socket of the second articulation member, and the second joint portion of the first articulation member includes a second socket that is connected with a second pivot, facing the second part at an assembled position. Still further in other examples of the invention, the bracket assembly may also include a connection plate having the second pivot connected with the second socket. The body of the first articulation member has a first through hole and the connection plate has a second through hole aligned with the first through hole to provide a passage for a fastener. A fastener might be used through the holes to connect the connection plate, the second part, and the first articulation member together.

In another embodiment, a bracket assembly to connect a first part with a second part may comprise a first articulation member and a second articulation member. The first articulation member is pivotably connected with the first part, and includes a first joint portion configured to provide a first pivot connection. The first articulation member may also have a second joint portion configured to provide a second pivot connection. The second articulation member includes a third joint portion pivotably connected with the first joint portion of the first articulation member, and a fourth joint portion coupled pivotably with the second part. Pivotable movement between the first and the third joint portions varies a length of the bracket. A length of the bracket is shorter at an assemble position than a length during an assembly process or at an un-assemble position.

In another embodiment, the third joint portion of the second articulation member includes a third socket and a fourth socket opened at a direction different from the third socket. The first joint portion of the first articulation member includes a first head at one end of a main body of the first articulation member and is connected with the third socket of the second articulation member. The second joint portion of the first articulation member includes a second socket at another end of the main body of the first articulation member and is connected with a second pivot and faces the second part at an assembled position. The articulation member main body includes a first portion and second portion that bend away from each other. There is a first head on the second portion. The first articulation member is longer than the second articulation member at the length direction.

According to another aspect, a vehicle comprises a load box with a sidewall and a side flange and a rail trim disposed on a top of the sidewall that includes a rib disposed along a lengthwise direction of the rail trim and extends downward from a main body of the rail trim, and a bracket assembly to connect the rail trim with the sidewall. The bracket assembly includes a first articulation member including a first joint portion configured to provide a first pivot connection, and a second joint portion configured to provide a second pivot connection and a second articulation member including a third joint portion pivotably connected with the first joint portion of the first articulation member and a fourth joint portion coupled pivotably with the rib of the rail trim. The pivotable movement between the first and the third joint portion varies a height of the bracket along a height direction of the sidewall to facilitate an assembling of the rail trim to the sidewall of the load box.

In another embodiment, the third joint portion of the second articulation member includes a third socket, and the fourth joint portion of the second articulation member includes a fourth socket opened at a direction different from the third socket. The first joint portion of the first articulation member includes a first head to be connected with the third socket of the second articulation member, and the second joint portion includes a second socket to be connected with a second pivot and facing the sidewall of the load box at an assembled position. The rib of the rail trim includes a tip portion with a round cross section that is connected with the fourth joint portion.

In another embodiment, a pivot cylinder roller is connected with the rib and the second articulation member. To connect the pivot roller, the rib includes a slender insert, or a thin protruding material. The pivot roller has a first through hole, and the fourth joint portion of the second articulation member includes a second through hole, and wherein the slender insert is configured to pass the through the first and second holes to enable the connection with the rib and the fourth joint by heat staking.

In another embodiment, the third joint portion of the second articulation member includes a bottom surface, and the rail trim including a lock surface. The bottom surface and the lock surface are configured to have an interference fit at the assembled position. Alternative to the interference fit, the third joint portion of the second articulation member can include a bottom surface, and the rail trim can include an inner wall substantially parallel to the rib. The end portion of the inner wall has a clip bended toward the rib. When the bottom surface of the third joint portion contacts the clip, it forms a snap fit with the clip at an assembly position which is particularly useful when using plastic injection molding process and particular usage demands a quick assembly process such as on a moving automotive production line.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed bracket assembly for attaching or affixing a load box rail trim to a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various bracket assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
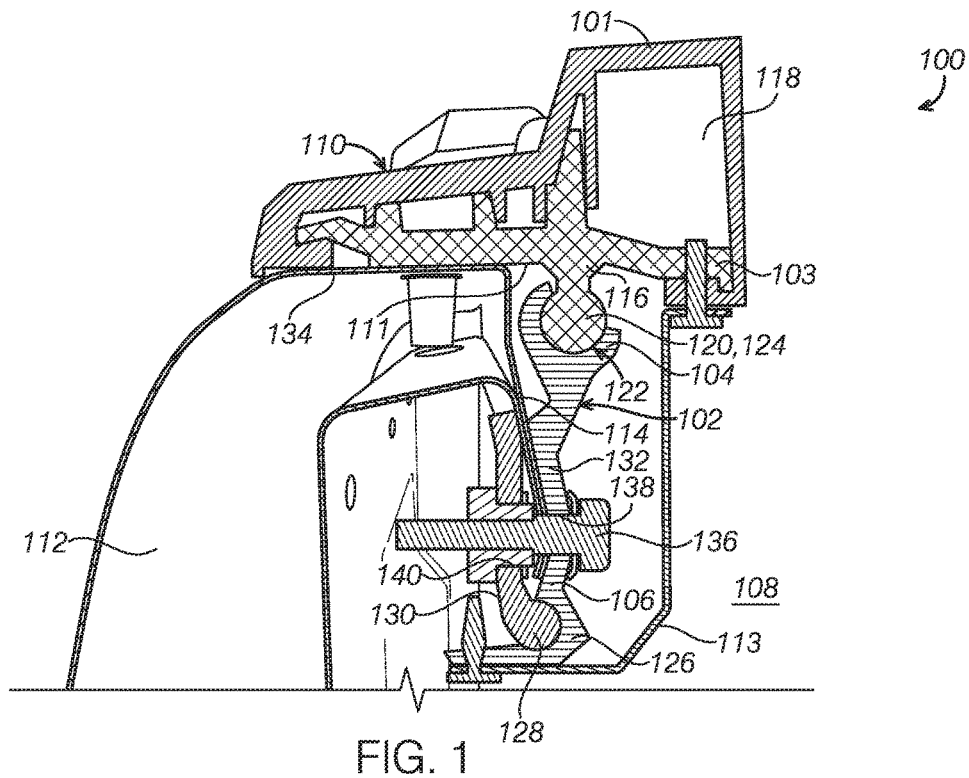
FIG. 1 is a cross sectional view of an example embodiment of a bracket assembly according to the present disclosure.

With reference to FIG. 1, a first example of a bracket assembly 100 of the present disclosure, will now be described. In the depicted embodiment, bracket assembly 100 is illustrated to connect a rail trim 110 that is formed from an injection molding and has two trim pieces 101, 103. The two trim pieces 101, 103 may be two parts formed separately in an injection molding or may be one integral part formed in the injection molding. It should be appreciated that the bracket assembly 100 can be used for attaching other types of rail trims such as a rail trim formed by blow molding or other manufacturing processes.

Turning to FIG. 1, the bracket assembly 100 is used to connect a first part and a second part. A connection surface of the first part forms with an angle with a connection surface of a second part at an assembly position. In the depicted embodiment, the first part is a sidewall 112 of a load box 108 of a truck and the second part is a rail trim 110. The connection surface of the sidewall 112 is a surface of a side flange 114 and the connection surface of the rail trim 110 is a bottom surface 111 of the rail trim 110. The bracket assembly 100 includes a first articulation member 102 having a first joint portion 104 and a second joint portion 106 on opposite ends of the first articulation member 102 to attach to a load box 108, and a rail trim 110, respectively. In depicted embodiment, the bracket assembly 100 connects the load box 108 to the rail trim 110 such that the rail trim 110 sits atop of the load box 108 and the bottom surface 111 of the rail trim 110 forms an angle with the side flange 114 or the sidewall 112 of the load box. It should be appreciated that the bracket assembly 100 may attach other peripherals or components to a vehicle, such as a tool box or shell to a truck bed.

Still referring to FIG. 1, the load box 108 may include the sidewall 112 and the side flange 114 for attachment, where the rail trim 110 may sit on a top 134 of the sidewall 112. The side flange 114 assists to secure the rail trim 110 to the load box 108 using bracket assembly 100. As is further seen in FIG. 1, the rail trim 110 may include a rib 116 extending downward from a rail trim main body 118 with a tip portion 120 that may have a circular cross section. The circular tip portion 120 may act as a first pivot 124 and allow for the first articulation member 102 to attach the rail trim 110 to the load box 108.

As can be seen in FIG. 1, in this example embodiment, the first articulation member 102 of bracket assembly 100 may have a main body 132 between the first joint portion 104 and the second joint portion 106. The main body 132 may include a plate with a plurality of bends along its length and configured to fit with the side flange 114 of the load box 108 and provide rigidity to bracket assembly 100. In alternate embodiments of the invention, the main body 132 may be substantially planar.

Still referring to FIG. 1, the first articulation member 102 may be formed from a sturdy and rigid material through any manufacturing process. In some embodiments, first articulation member 102 may be formed from extruded aluminum. In other embodiments, the first articulation member 102 may be formed from other metals, such as steel, or formed from hard plastic. The first articulation member 102 may also be shaped by milling, injection molding, or any other manufacturing process.

As further seen in FIG. 1, the bracket assembly 100 may further include a connection plate 130. The connection plate 130 may have a main body and an end portion 128 and connect to the first articulation member at the end portion 128. In some embodiments, the end portion 128 may include a second pivot. The second pivot 128 may be a rounded or cylindrical head sized to connect and pivot with the first articulation member 102.

Still referring to FIG. 1, the connection plate 130 may be formed from a similar material and in a similar manufacturing style as the first articulation member 102. In some embodiments, the connection plate 130 may be formed from extruded aluminum. In other embodiments, the connection plate 130 may be formed from differing materials or metals than that of the first articulation member 102. For example, the connection plate 130 may be formed from steel, or from hard plastics and formed or shaped with any appropriate manufacturing process.

Still referring to FIG. 1, the first joint portion 104 of the first articulation member 102 may provide for a first pivot connection. The first joint portion 104 may include a first socket 122 and the tip portion 120 of the rib 116 may include a first pivot 124. The first socket 122 may be c-shaped, where there is an opening on one side of the first socket 122.

The first pivot 124 may be a circular or cylindrical shaped protrusion integrally formed on the tip portion 120 of the rib 116. The c-shaped opening of the first socket 122 may be smooth and sized to accept the first pivot 124 of the rib 116 such that the first pivot 124 fits inside the first socket 122. The first pivot 124 and first socket 122 are pivotably connected such that the first pivot 124 may rotate in the first socket 122 to adjust to different angles. In this example embodiment, the first pivot 124 and the first socket 122 allow the rail trim 100 to be placed on the load box 108 at an angle at an initial assembling, and then be rotated into another angle for attachment. This feature allows for ease of connection and assembly, allowing a large range of acceptable angles. After the first pivot 124 and the first socket 122 are connected, then the rail trim 110 may be rotated into a different position at a different angle in relation to the load box 108.

As seen in FIG. 1, the second joint portion 106 may provide a second pivot connection, where the second joint portion 106 may include a second socket 126 on the first articulation member 102, and the connection plate 130 may include a second pivot 128. The second socket 126 may be c-shaped, where there is an opening on one side of the second socket 126. The opening of the first socket 122 and the second socket 126 may be located such that each opening faces an opposite side of the first articulation member 102, and in different directions. The c-shaped opening of the second socket 126 is smooth and sized to accept the second pivot 128 such that the second pivot 128 fits inside of the second socket 126. The second pivot 128 and second socket 126 fit such that the second pivot 128 may rotate in the second socket 126 to adjust to different angles. In this example embodiment, the second pivot 128 and second socket 126 allow for the connection plate 130 and first articulation member 102 to articulate and maneuver into a final assembly position, the final assembly position being where the connection plate 130 is located between the side flange 114 and sidewall 112 of the load box 108 and the first articulation member 102 is located on an opposite side of the side flange 114.

As seen in FIG. 1, when bracket assembly 100 is in the assemble position. A fastener 136 may be used to secure bracket assembly 100 to the load box 108. In the depicted embodiment, the main body 132 of the first articulation member 102 may include a first through hole 138, and the connection plate 130 may include a second through hole 140. The first through hole 138 and the second through hole 140 may align to allow for passage of the fastener 136 through them. Additionally, there may be a hole, slot, notch, or other through hole located on the side flange 114 of the load box 108. This hole on the side flange 114 may also align with the first through hole 138 and second through hole 140 so that a fastener may be inserted through the holes simultaneously to connect the connection plate 130, side flange 114, and first articulation member 102 together. In this example embodiment, the fastener 136 may be an adjustable bolt. In other embodiments, the fastener may be a screw, bolt, snap fastener, or other type of fastening system.

As can be seen in FIG. 1, after bracket assembly 100 is in position and connected to the load box 108 or second part at the second joint portion 106, and the rail trim 110 is connected to the bracket assembly 100 at the first joint portion 104, the rail trim 110 or first part may be rotated at the first joint portion 104 if it is not already connected. The rail trim 110 or first part may rotate at an angle into place onto the top 134 of the sidewall 112. The rail trim 110 may then be secured as needed to the top 134 of the sidewall 112 of the load box 108 using a fastener. The fastener may include a bolt, screw, adhesive, snap connection, clamp, or any other fastening system.

FIG. 1 also shows a cover 113 which is connected to the rail trim 110 and the sidewall 112 of the load box to conceal the bracket assembly 100.

Figure 2:
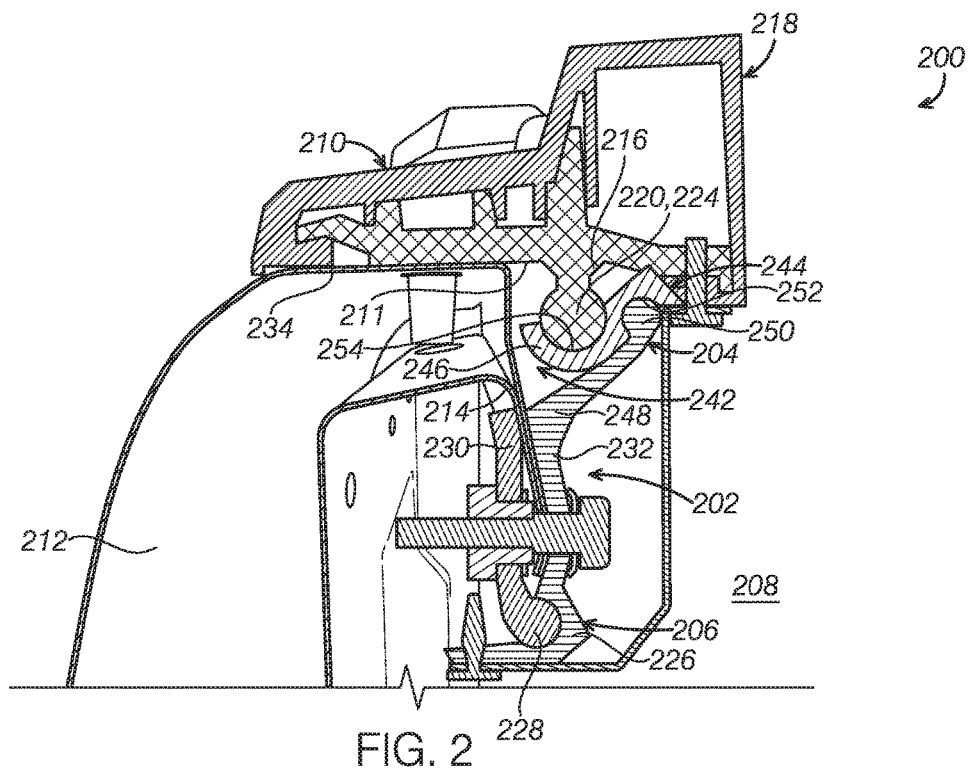
FIG. 2 is a cross sectional view of another example embodiment of a bracket assembly according to the present disclosure.

Turning now to FIGS. 2-5, another example embodiment of bracket assembly 200, will now be described. Bracket assembly 200 functions to connect a load box rail trim to a truck bed utilizing a plurality of articulating members. As can be seen in FIG. 2, bracket assembly 200 includes a first articulation member 202 and a second articulation member 242. The first articulation member 202 may include a first joint portion 204 and a second joint portion 206 located on opposite ends of the first articulation member 202. The second articulation member 242 may include a third joint portion 244 and a fourth joint portion 246 at opposite ends of the second articulation member 242. Bracket assembly 200 may connect a load box 208 to a rail trim 210 or second part. A connection surface of a side flange 214 of the load box 208 forms an angle with a bottom surface 211 of the rail trim 210. It should be appreciated that the bracket assembly 200 may attach other peripherals or components to a vehicle, such as a tool box or shell to a truck bed.

Still referring to FIG. 2, the load box 208 may include a sidewall 212 and a side flange 214 for attachment, where the rail trim 210 may sit on a top 234 of the sidewall 212. The side flange 214 assists to secure the rail trim 210 to the load box 208 using bracket assembly 200. As is further seen in FIG. 2, the rail trim 210 may include a rib 216 extending downward from a rail trim main body 218 with a tip portion 220 that may have a circular cross section. The integrally formed circular tip portion 220 may act as a first pivot 224 and allow for the bracket assembly 200 to attach, assembling the rail trim 210 to the load box 208. In alternate embodiments, the first pivot 224 may not be integrally formed with the rail trim 210, but may be attached separately as described in detail below.

As can be seen in FIG. 2, in this example embodiment, the first articulation member 202 of bracket assembly 200 may have a main body 232 between the first joint portion 204 and the second joint portion 206 and may include a plurality of bends. In this example embodiment, the first articulation member 202 includes a bend 248 between the first joint portion 204 and the second joint portion 206. The bend 248 is configured such that the first joint portion 204 is disposed further away to the sidewall 212 or the side flange 214 than the second joint portion 206 at an assembly position. The elongated main body 232 of the first articulation member 202 and the bend 248 may be configured to confirm with the shape of the side flange 214, as well as provide a space sufficient for the first articulation member 202 and second articulation member 242 to articulate to easily and efficiently secure the load box 208 to the rail trim 210.

Still referring to FIG. 2, the first articulation member 202 and second articulation member 242 may be formed from a sturdy and rigid material through any manufacturing process. In some embodiments, the first articulation member 202 and second articulation member 242 may be formed from extruded aluminum. In alternate embodiments, the first articulation member 202 and second articulation member 242 may be formed from different metals, such as steel, or from plastic.

As further seen in FIG. 2, bracket assembly 200 may further include a connection plate 230. Connection plate 230 may have an elongated main body and an end portion to be connected to the first articulation member. The end portion of the connection plate 230 may include a second pivot 228. The second pivot 228 may be a rounded or cylindrical head sized to connect and pivot with the first articulation member 202.

Still referring to FIG. 2, the connection plate 230 may be formed from a similar material and in a similar manufacturing style as the first articulation member 202 and second articulation member 242. In this example embodiment, the connection plate 230 may be formed from extruded aluminum. In alternate embodiments of the invention, the connection plate 230 may be formed from differing materials or metals than that of the first articulation member 102 and the second articulation member 202. For example, the connection plate 230 may be formed from steel, or from hard plastics and shaped with any appropriate manufacturing process.

Still referring to FIG. 2, the first articulation member 202 may include a first joint portion 204 and may provide for a first pivot connection. The first joint portion 204 may include a first head 250. The first head 250 may be a circular or cylindrical shaped protrusion. Still seen in FIG. 2, The second articulation member 242 may include a third joint portion 244 located at one end of the second articulation member 242. The third joint portion 244 may include a third socket 252 which may be c-shaped, where there is an opening on one side of the third socket 252. The third socket 252 may be smooth and sized to accept the first head 250 of the first articulation member 202 such that the first head 250 fits inside the third socket 252 and they may rotate in relation to each other to adjust the first articulation member 202 and the second articulation member 242 to different angles and vary the collective length of the first and second articulation member 202, 242.

Still in reference to FIG. 2, the second articulation member 242 may include a fourth joint portion 246. The fourth joint portion 246 may include a fourth socket 254 which may be c-shaped and has an opening on one side of the fourth socket 254. The opening of the fourth socket 254 and the third socket 252 may be located such that they face opposite directions. The fourth socket 254 may be smooth and sized to accept the first pivot 224 of the rib 216 such that the first pivot 224 fits inside the fourth socket 254. The first pivot 224 and the fourth socket 254 is pivotably fit such that the fourth socket 254 is rotatable during an assembling process. The first articulation member 202 and the second articulation member 242 allow for larger clearance and provide larger swept swinging articulation motion/action in a lateral arc and in altitude which is especially useful in production environments As can be seen in FIG. 2, the second joint portion 206 of the first articulation member 202 may provide a second pivot connection, where the second joint portion 206 may include a second socket 226, and the connection plate 230 may include a second pivot 228. The second socket 226 may be c-shaped and has an opening on one side of the second socket 226. The c-shaped opening of the second socket 226 is smooth and sized to accept the second pivot 228 such that the second pivot 228 fits inside of the second socket 226. The second pivot 228 and second socket 226 fit such that the second pivot 228 may rotate in the second socket 226 to adjust to different angles. In some embodiments, the second pivot 228 and second socket 226 allow for the connection plate 230 and first articulation member 202 to articulate and maneuver into a final assembly position, the final assemble position being where the connection plate 230 is located between the side flange 214 and sidewall 212 of the load box 208 and the first articulation member 202 is located on an opposite side of the side flange 214. In some embodiments, the final assemble position may further include connection between the second articulation member 242 is connected with one side of the rail trim 210.

Figure 3:
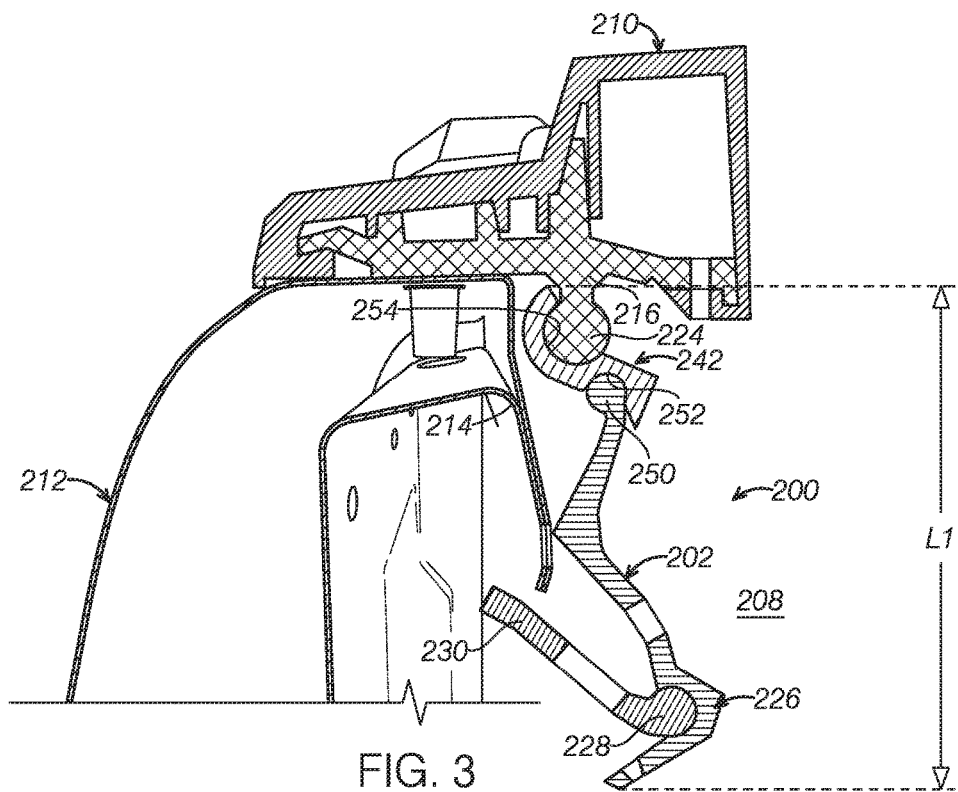
FIG. 3 is a cross sectional view of the bracket assembly shown in FIG. 2 depicting the bracket assembly in an open position or a position during an assembling process.
Figure 4:
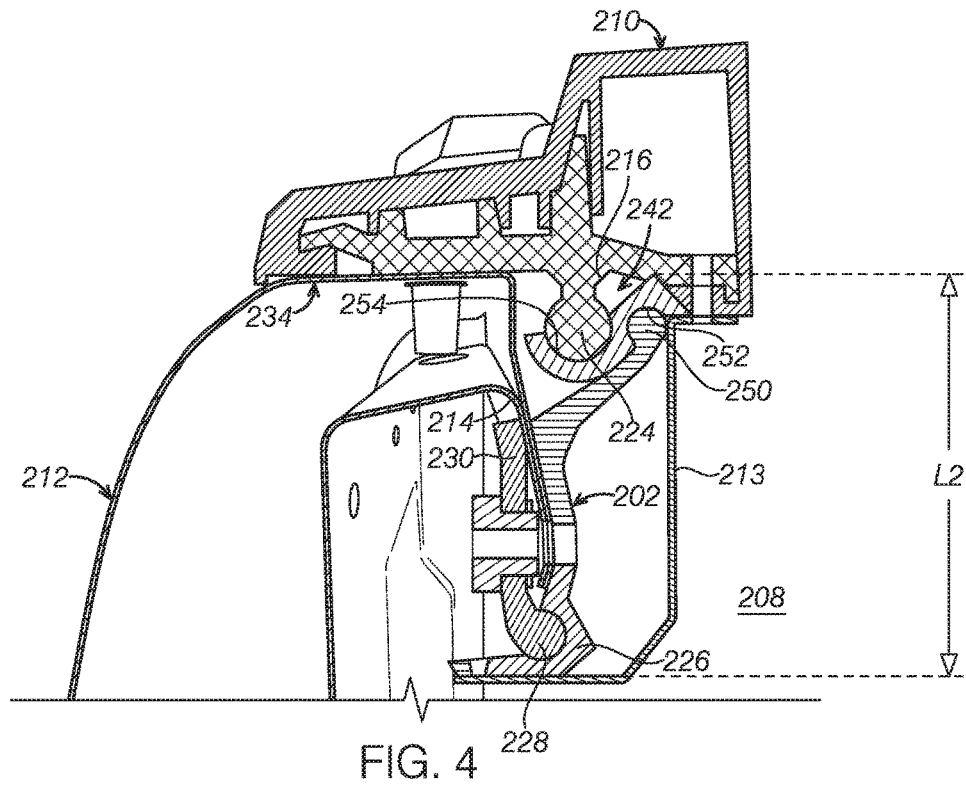
FIG. 4 is a cross sectional view of the bracket assembly shown in FIG. 2 depicting the bracket assembly at an assembly position.

Turning now to FIGS. 3-5, bracket assembly 200 may articulate to adjust to different lengths and angles in relation to the sidewall 212 to facilitate assembling the rail trim 210 to the sidewall 212 of the load box 208. In the assembling process, as shown in FIG. 3, bracket assemble 200 may begin in an open and unattached configuration, where the connection plate 230 is connected to the first articulation member 202 with the second pivot 228 inside second socket 226, and the first articulation member 202 is connected to the second articulation member 242 with the first head 250 inside the third socket 252. Bracket assembly 200 may then be attached to the rail trim 210 by connecting the first pivot 224 to the fourth socket 254. While in the open and unattached position, the rail trim 210 may be set down or positioned on the sidewall 212 of the load box 208 and fixed or temporarily located to the top of the load box 208 via any suitable methods or approaches such as a fastener. In an alternative scenario, the rail trim 210 may be positioned on the sidewall 212 after bracket assembly 200 is attached to the side flange 214 of the load box 208.

Continuing in the attachment process, and as exemplified in FIG. 4, bracket assembly 200 is adjusted to a position for attachment to the side flange 214 of the load box 108. In this example embodiment, the second pivot 228 and second socket 226 allow for the connection plate 230 and first articulation member 202 to articulate and maneuver into a final assembly position.

Still referring to FIG. 4, the rail trim 210 may then be positioned and fastened to the top 234 of the load box 208, if not previously done so. Because the first articulation member 202 and the second articulation member 242 rotate in relation to one another, the rail trim can be put on the top of the rail trim 210 in the different angles during the assembling process and it is not necessary to place the rail trim 210 at specific position such as a position where a bottom surface of the rail trim being about 90 degrees relative to the sidewall of the load box in order for the body of the bracket to be connected with the sidewall properly. After the rail trim 210 is positioned and attached, the first articulation member 202 and the second articulation member 242 are then rotated into a lock position, where the first articulation member 202 and the second articulation member 242 move closer together, shortening the overall length of bracket assembly 200 or lessening the height of bracket assembly 200 along a height direction of the sidewall 212, and a bottom portion of the second articulation member 242 may be locked to a sidewall of the rail trim as described in detail in FIGS. 6-7 below. In the lock position, bracket assembly 200 may further secure the rail trim 210 to the load box 208, adding strength and stability while making the assembly process easier.

Referring to FIGS. 3 and 4, the pivotable movement between the first and the third joint portions varies a length of the bracket assembly. FIG. 3 shows that a length of the bracket assembly 200 is L1 at an un-assembled position. FIG. 4 shows that a length of the bracket assembly 200 is L2 at the assembly position which is shorter than the length L1 at the assembled position. Further, the first and second articulation members 202, 242 can be rotated to different angles relative to the side flange 214.

Now referring to FIG. 5, in this example embodiment, the second pivot 228 and second socket 226 allow for the connection plate 230 and first articulation member 202 to articulate and be positioned in a final assembly position, the final assembly position being where the connection plate 230 is located between the side flange 214 and sidewall 212 of the load box 208 and the first articulation member 202 is located on an opposite side of the side flange 214. When bracket assembly 200 is in position and ready for final attachment to the load box 208, a fastener 236 may be used to secure bracket assembly 200 to the load box 208. In this example embodiment, the first articulation member 202 may include a first through hole 238, and the connection plate 230 may include a second through hole 240. The first through hole 238 and the second through hole 240 may align to allow for passage of the fastener 236 through them. Additionally, there may be a hole, slot, notch, or other through hole located on the side flange 214 of the load box 208. This hole on the side flange 214 may also align with the first through hole 238 and second through hole 240 so that a fastener may be inserted through the holes simultaneously to connect the connection plate 230, side flange 214, and first articulation member 202 together. In this example embodiment, the fastener 236 may be an adjustable bolt. In other embodiments, the fastener may be a screw, bolt, snap fastener, or other type of fastening system.

Figure 5A:
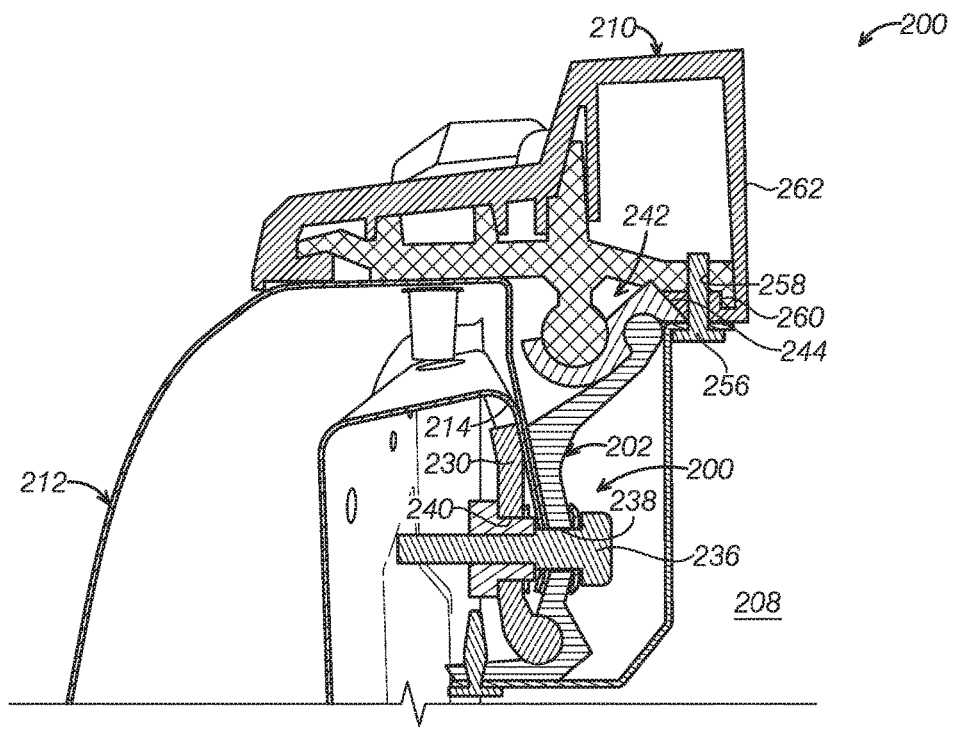
FIG. 5A is a cross sectional view of the bracket assembly shown in FIG. 2 depicting the bracket assembly in an assemble position, where there is a bolt securing the bracket assembly.

As can be seen in FIG. 5A, after bracket assembly 200 is in the locked position and the load box 208 is connected to the rail trim 210, a security fastener 256 may be used to further secure the load box 208 to the rail trim 210. The security fastener 256 may provide an interference with the first articulation member 202 and the second articulation member 242 after they have been rotated into the locked position at the first joint portion 204 and the third joint portion 244. The security fastener 256 may be a bolt or screw that is secured in a rail trim hole 258 located at an end portion 260 of an inner wall 262 of the rail trim 210. After being secured in place, the security fastener 256 prevents the first articulation member 202 and the second articulation member 242 from rotating.

Figure 5B:
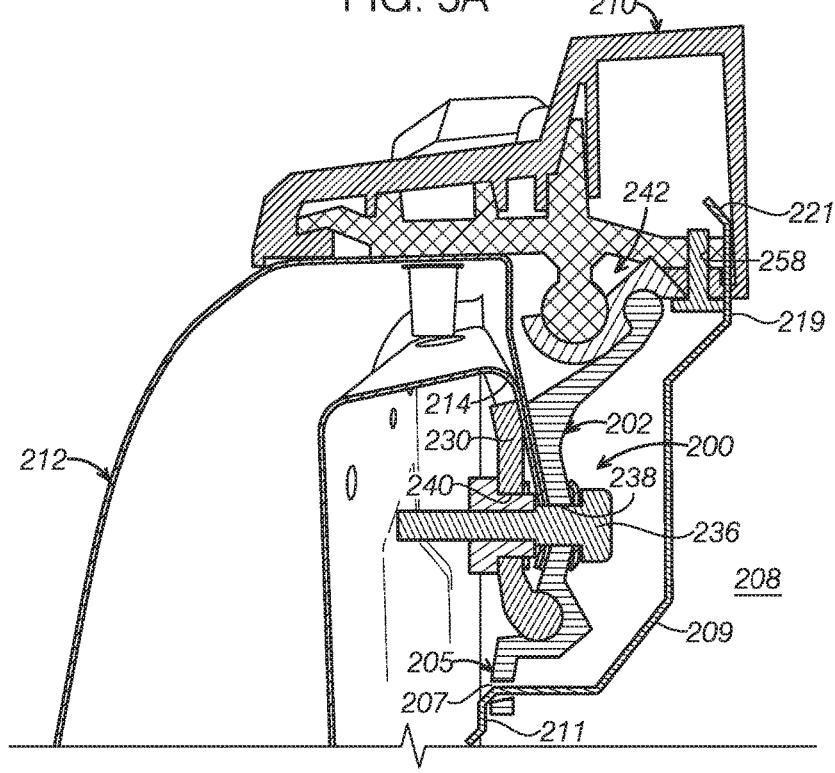
FIG. 5B shows another alternative to attach an inner cover without need for threaded fasteners.

FIG. 5B shows another alternative to attach an inner cover 209 without need for fasteners. The bracket assembly 200 may further include a connection member 205 with an aperture 207. A lower end 211 of the inner cover 209 may be flex and fit into the aperture 207 to be connected with the bracket assembly 200. A small flexible return flange 221 can be used to prevent inner cover 209 slipping out from rail assembly 210.

Figure 5C:
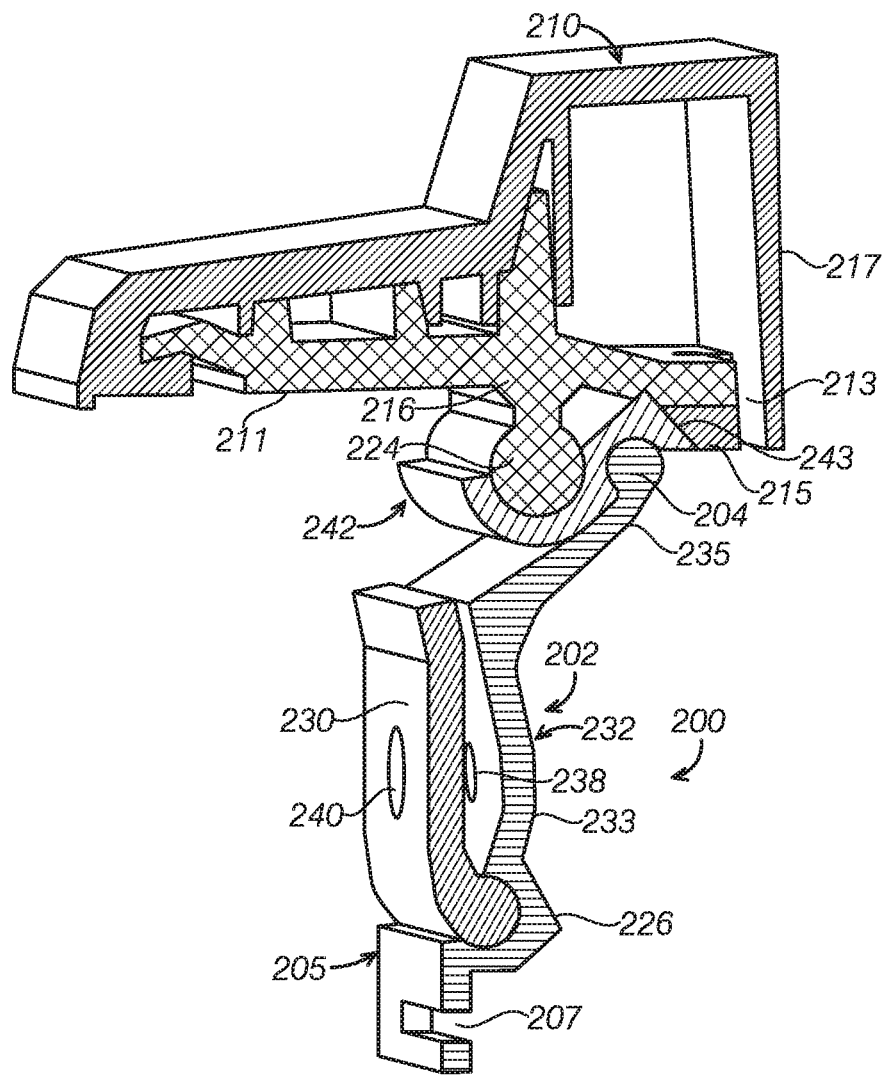
FIG. 5C is a perspective view of the bracket assembly in FIG. 5B.

FIG. 5C is a perspective view of the bracket assembly in FIG. 5B. An inner sidewall 217 of the rail trim 210 may include a groove 213 to receive an upper end 219 of the inner cover 209.

Figure 6:
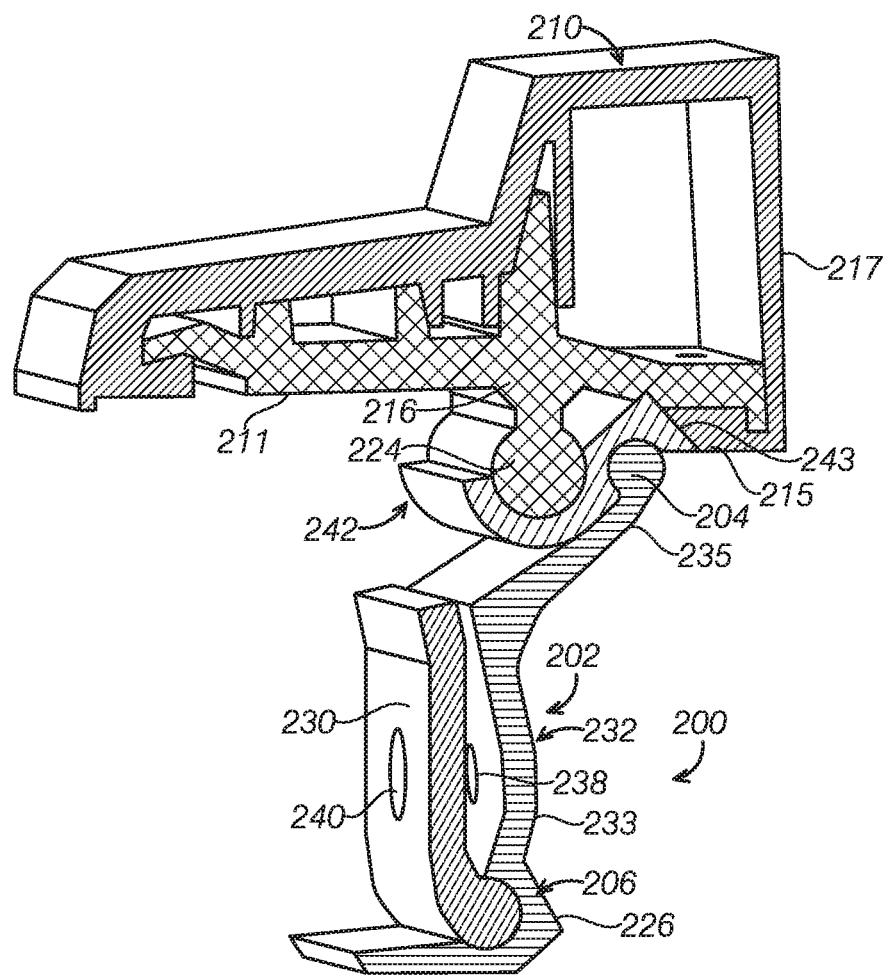
FIG. 6 is a perspective view of the bracket assembly shown in FIG. 2 depicting the connection with a rail trim.

FIG. 6 shows a perspective view of the bracket assembly 200, illustrating connections with the rail trim 210. The second articulation member 242 is shown to be pivotably connected with the first pivot 224 of the rail trim 210. Further, a bottom 243 of the second articulation member 242 is connected to a bottom portion 215 of the rail trim 210 via interference fit. That is the second articulation member 242 is at a locked position.

FIG. 6 further shows that the first articulation member 202 has a main body 232 between the first joint portion 204 and the second joint portion 206. The main body 232 may include a plate with a plurality of bends along its length. The first joint portion 204 is bended toward an inner sidewall 217 of the rail trim 210. For example, the main body 232 includes a first portion 233 and a second portion 235 bend away from the first portion 233 and the first head is on the second portion 235. In some embodiments, the first articulation member 202 is longer than the second articulation member 242.

The through hole 238 in the main body 232 of the first articulation member 202 and the through hole 240 in the connection plate 230 are shown in FIG. 6, which are aligned to receive a fastener to fix the bracket assembly 200 to the sidewall of the load box.

Figure 7:
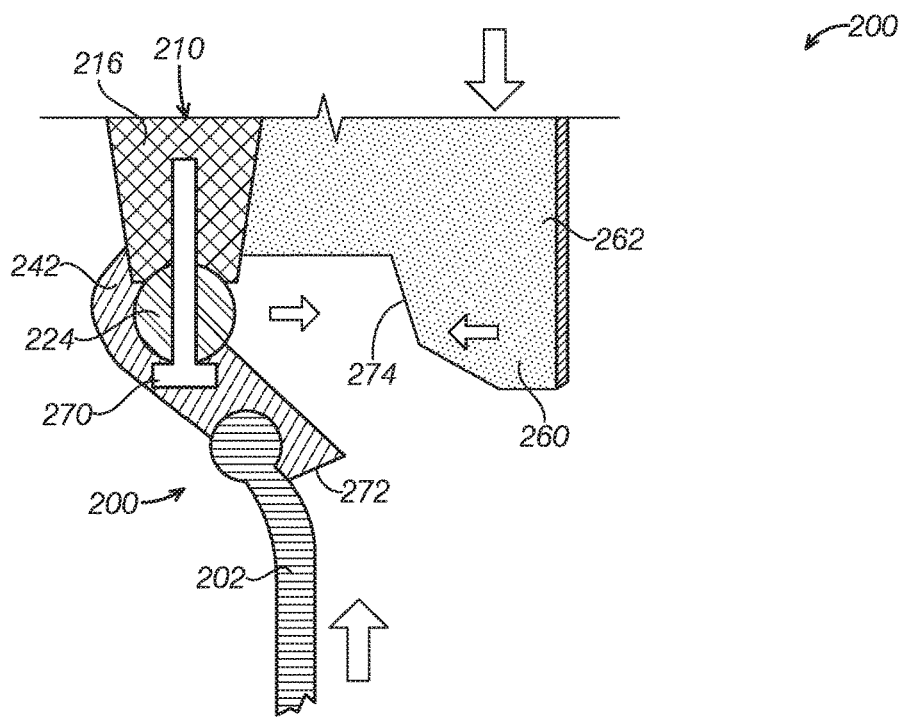
FIGS. 7-8 are a cross sectional view of the bracket assembly shown in FIG. 2 depicting the bracket assembly at an unlocked position and a locked position with an interference fit in FIG. 7 and a flexible snap-fit in FIG. 8.
Figure 8:
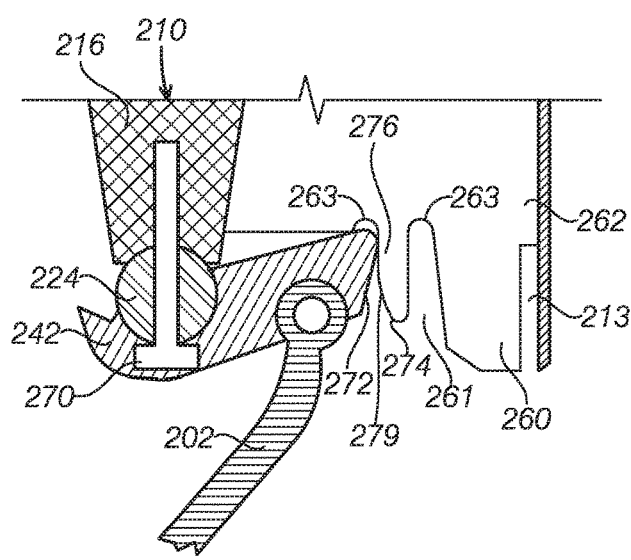

Now turning to FIGS. 7-8, in some embodiments, in addition to the pivot connection between the first pivot 224 coupled with the rail trim 210 and the fourth socket 254, the third joint portion 244 may be locked to a sidewall of the rail trim 210. The bracket assembly 200 may be further secured in a final assembly position through utilizing an interference fit. FIG. 7 shows bracket assembly 200 in an unlocked position, where the first articulation member 202 and the second articulation member 242 are at an extended length. The second articulation member 242 includes a bottom surface 272 on one end of the second articulation member 242. The rail trim 210 includes a lock surface 274 located at an end portion 260 of the inner wall 262 of the rail trim 210. At the unlocked position, the bottom surface 272 and the lock surface 274 do not interface.

As can be seen in FIG. 8, when bracket assembly 200 is at the locked position, the bottom surface 272 of the second articulation member 242 and the lock surface 274 of the inner wall 262 make an interference fit. In the depicted embodiment, the second articulation member 242 and the inner wall 262 of the rail trim 210 may be configured to be interference fit, which is achieved by friction after the bottom surface 272 of the second articulation member 242 is pushed or compressed to contact the lock surface 274 of the rail trim 210.

FIGS. 7-8 further show a rib 216 of the rail trim 210. It should be appreciated that the rib 216 and the inner wall 262 may be molded integrally as on piece in the process such as injection molding. In the depicted embodiment, the first pivot 224 is a separate pieced from the rib 216, The connection between the first pivot 224 and the rib 216 will be described in detail in FIG. 11. FIG. 8 demonstrates a snap fit 277 with an opening 261 and notches 263 to accommodate for the movement of snap fit clip face 279 as the rounded interfacing tip 272 of the second articulation member 242 slides along the clip face 279 when moving between assembled (locked) and un-assembled (unlocked) position. FIG. 8 also shows a slot or groove 213 which can be used to retain upper end 219 of the inner cover 209.

Figure 9A:
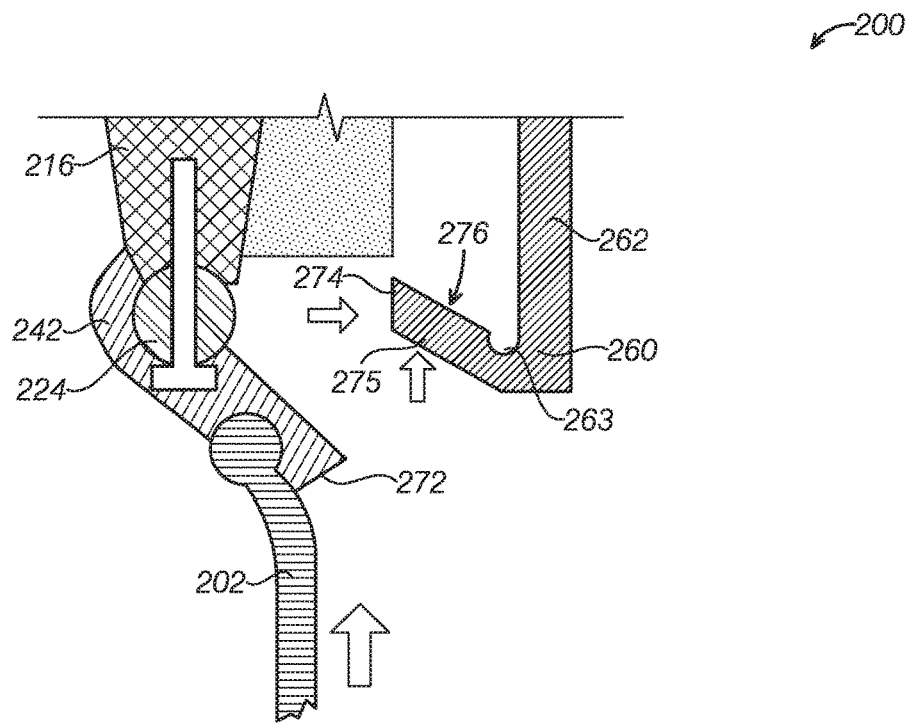
FIGS. 9A-10B are a cross sectional view of the bracket assembly shown in FIG. 2 depicting the bracket assembly at an unlocked position and a locked position with a snap fit.
Figure 9B:
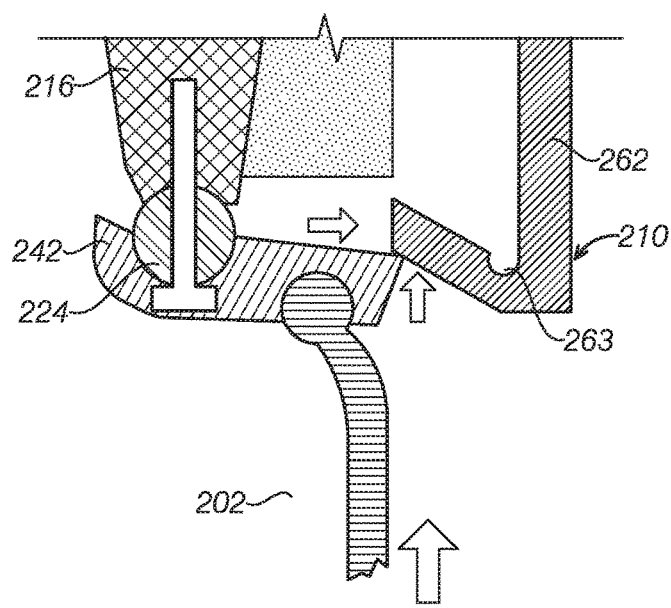

Now turning to FIG. 9A-10B, an alternative embodiment to lock and release of the third joint portion 244 to a sidewall of the rail trim 210 is illustrated. The bracket assembly 200 may be further secured in an assemble position through utilizing a clip that provides a snap fit. FIG. 9A shows bracket assembly 200 in an unlocked position, where the first articulation member 202 and second articulation member 242 are at an extended length. The second articulation member 242 includes a bottom surface 272. The rail trim 210 includes a flexible free end 275 or a clip 276 located at an end portion 260 of the inner wall 262 of the rail trim 210 and the flexible free end 275 is same portion of the inner wall 262 that bends toward the rib 216. FIG. 9B shows that, as the second articulation member 242 moves upward and rotates bout the first pivot 224, the flexible free end 275 flexes and snap fit with the bottom surface 272 of the second articulation member 242. In the unlocked position, the bottom surface 272 and the lock surface 274 do not interface.

Figure 10A:
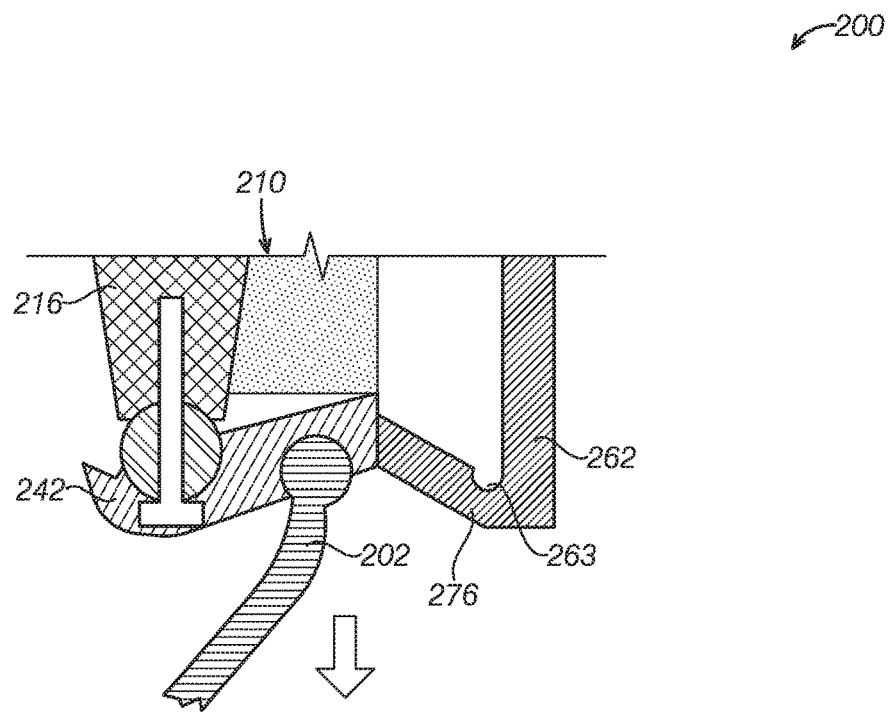
Figure 10B:
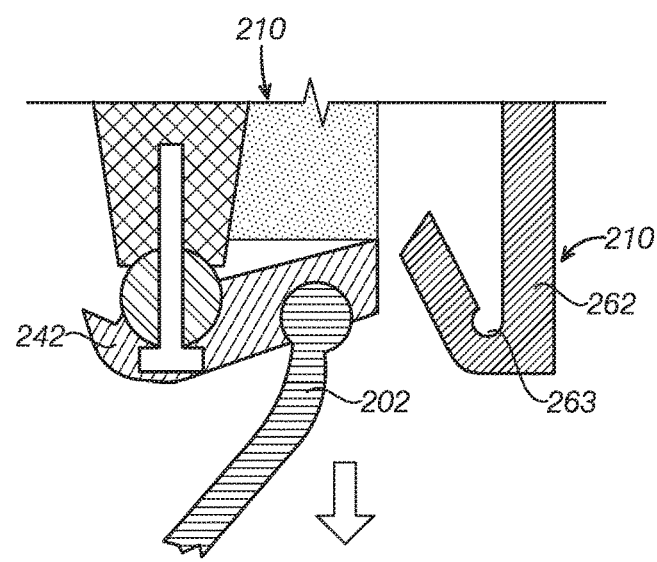

As can be seen in FIG. 10A, when bracket assembly 200 is in a locked position, the bottom surface 272 of the second articulation member 242 and the clip 276 of the inner wall 262 make a snap fit. In the snap fit, as the second articulation member 242 rotates from the unlocked position to the locked position, it interacts with the clip 276 of the inner wall 262, flexing the clip 276 out and away from the rib 216. When the second articulation member 242 is fully rotated in the final assembly position, the clip 276 flexes back inward toward the rib 216 to secure the second articulation member 242. In order to release the second articulation member 242 from the final assembly position, the clip 276 would need to be pushed up, allowing the bottom surface 272 of the second articulation member 242 and the lock surface 274 of the clip 276 to be disengaged so that the bracket assembly 200 moves away from the inner wall 262 of the trim 210.

Figure 11:
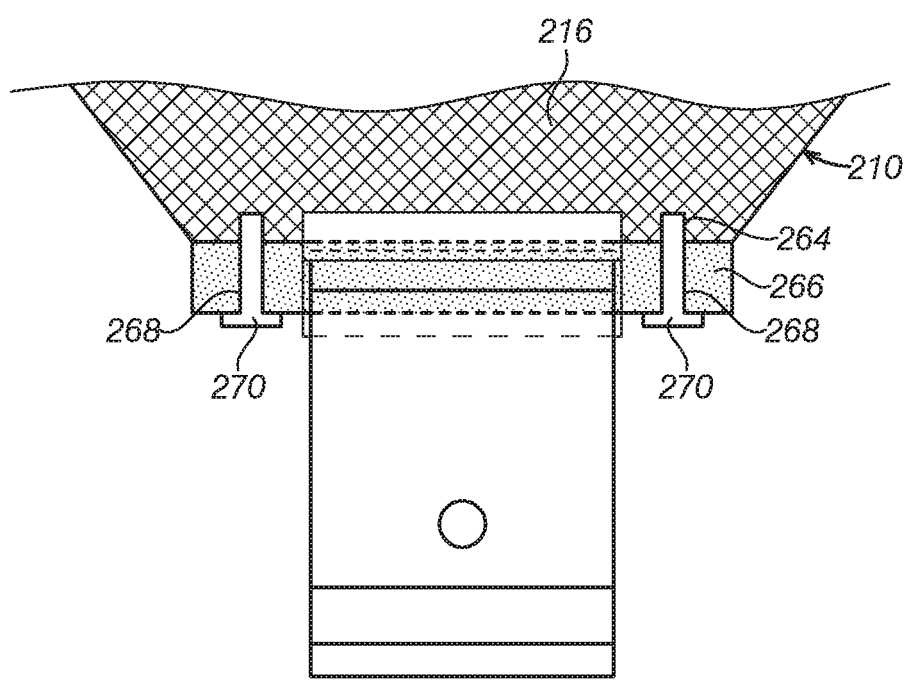
FIG. 11 is a side view of a bracket assembly according to another embodiment of the present disclosure.

Now turning to FIG. 11 and with further reference to FIGS. 7-10, in some embodiments, the bracket assembly 200 may utilize a separate attachment piece for a first pivot. The rib 216 of the rail trim 210 does not include an integrally formed first pivot. Instead, the rib 216 includes one or more rib holes 264 located at a tip portion 220 of the rib 216. Attached to the tip portion 220 of the rib 216 is a pivot bar roller 266, where the pivot roller 266 has a circular or cylindrical shape and includes one or more pivot roller holes 268 that may align with the rib holes 264 such that a bolt 270, screw or other attachment piece may be inserted through the holes to attach the pivot roller to the rib 216. In this example embodiment, the pivot bar roller 266 is the first pivot point 224. The second articulation member 242 may then attach to the pivot roller. The pivot roller 266 may be made from extruded aluminum, plastic, or other sturdy material.

Figure 12A:
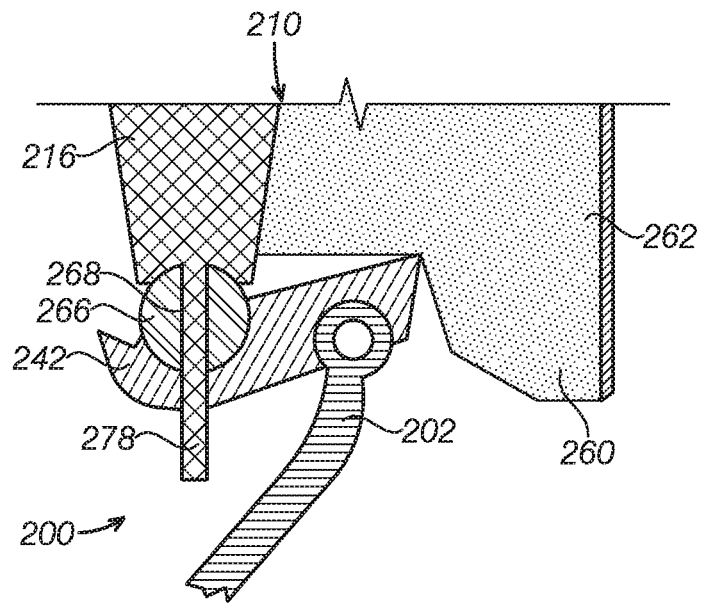
FIG. 12A-12B is a cross sectional view of the bracket assembly shown in FIG. 2 depicting the bracket assembly with a slender insert through a pivot roller and connected via heat staking.
Figure 12B:
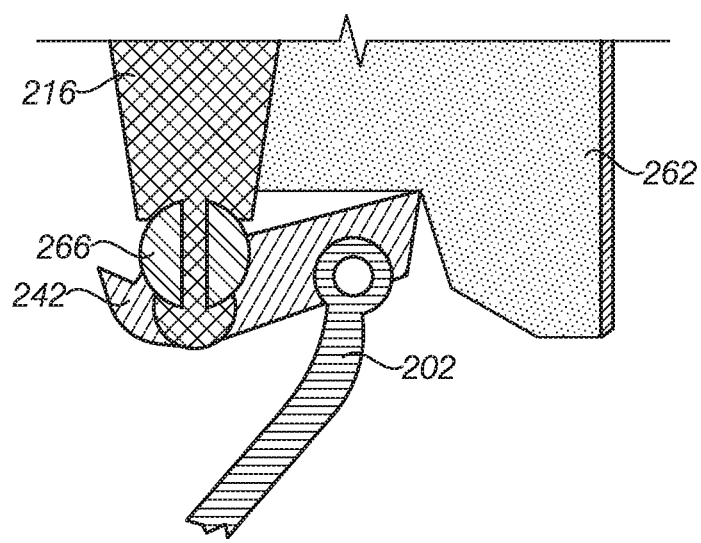

Now turning to FIGS. 12A-12B, an alternate embodiment of bracket assembly 200 may utilize a separate attachment piece for a first pivot and heat staking to attach the separate attachment piece to the rib. As seen in FIG. 12A, in this alternate example embodiment, the rib 216 of the rail trim 210 does not include an integrally formed first pivot. Instead, the rib 216 includes one or more slender inserts 278 located at a tip portion 220 of the rib 216. The slender inserts 278 may be a round or rectangular pin molded integrally with a rib 216 of the rail trim. The pivot roller 266 has a circular or cylindrical shape and includes one or more pivot roller holes 268 which may be a first through hole and a second through hole that may align with the slender inserts 278 such that they may be inserted through the pivot bar roller holes 268.

As seen in FIG. 12B, after insertion of the slender inserts 278 through the pivot roller holes 268, a tip of the slender inserts 278 is heat staked (melted) to create a blob of the material which retains the pivot roller 266 in place without need for threaded fastener. The blob also locates the second articulate member 242 on the pivot roller 266 as done by the fastener 270 in FIG. 11.

Figure 13A:
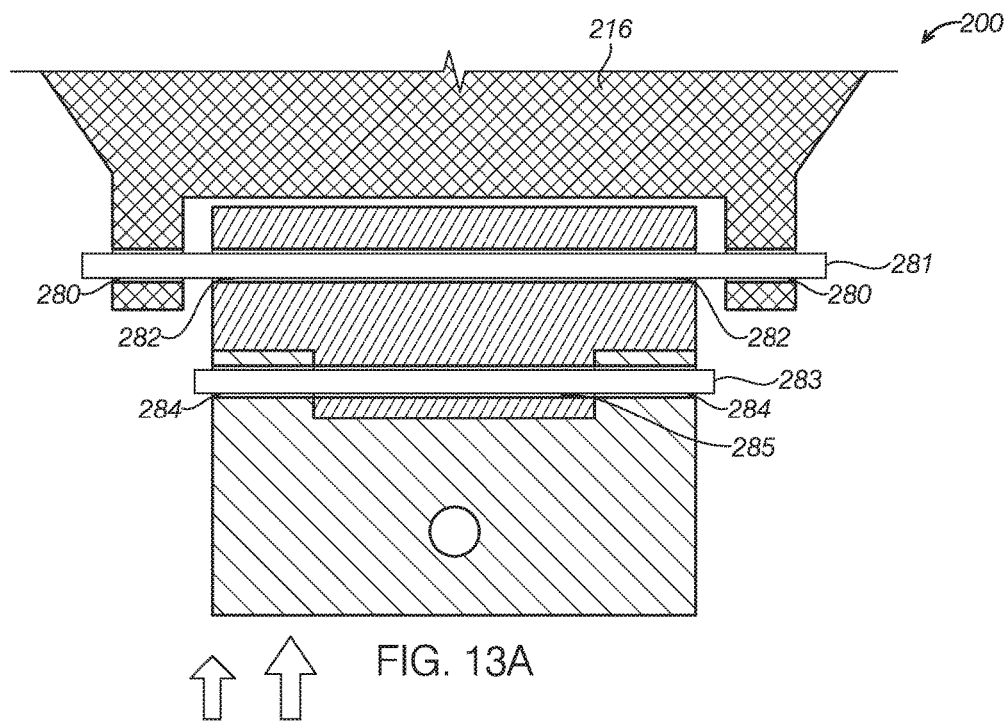
FIG. 13A is a side view of another example bracket assembly according to the present disclosure.
Figure 13B:
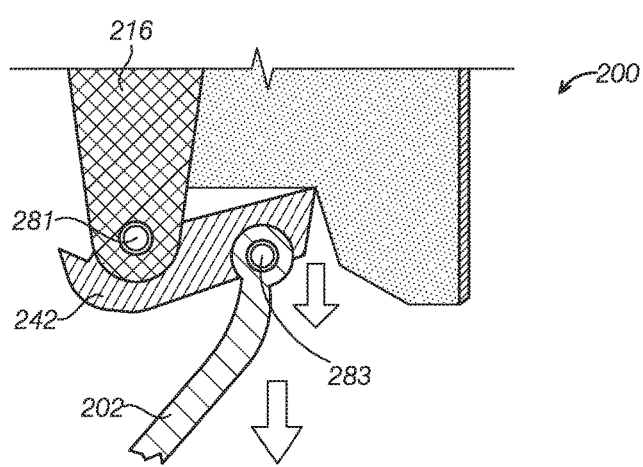
FIG. 13B is a cross sectional view of the bracket assembly shown in FIG. 13A depicting the bracket assembly with side holes aligned.

Now turning to FIGS. 13A-13D, another alternate embodiment of bracket assembly 200 may form rotatable joints by attaching pins 281 and 283 or bolts or shoulder screws through holes located on the articulating members. As can be seen in FIGS. 13A-13B, in this example embodiment, the rib 216 may include one or more side holes 280 that pass through the rib 216. Likewise, the second articulation member 242 may include side holes 282 that align with the side holes 280 of the rib. Further still, the second articulation member may include side holes 284 that align with side holes 285 located on the first articulation member 202. By aligning the side holes, a pin or screw may be inserted to allow for the rotation and articulation of the first articulation member 202 and the second articulation member 242.

Figure 13C:
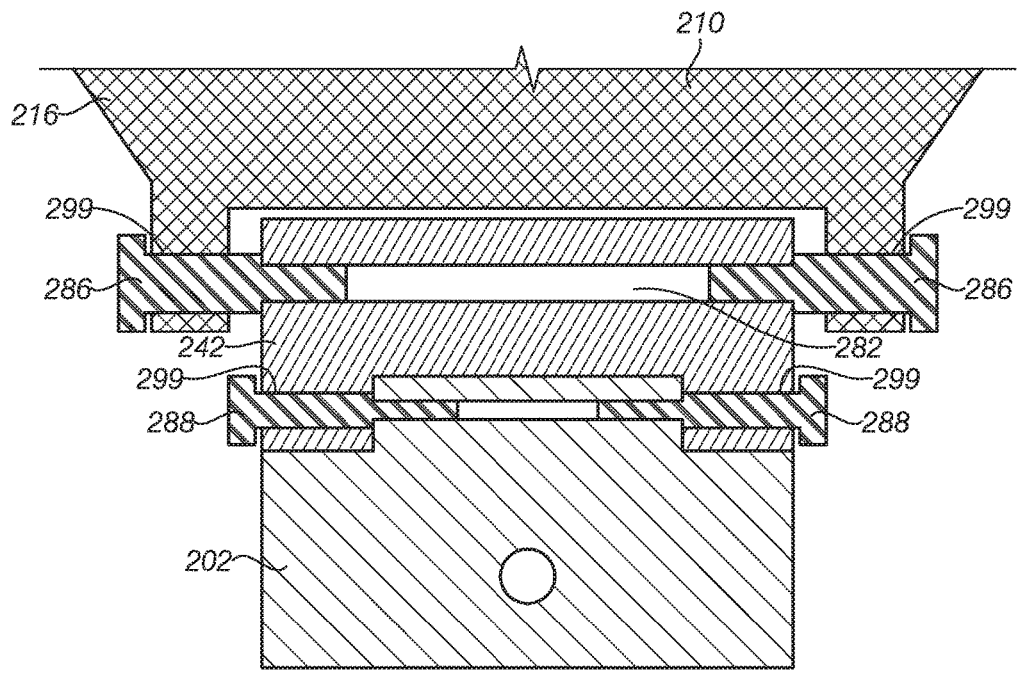
FIG. 13C is a cross sectional view of the bracket assembly shown in FIG. 13A depicting the bracket assembly with side shoulder bolts connecting the articulation members.
Figure 13D:
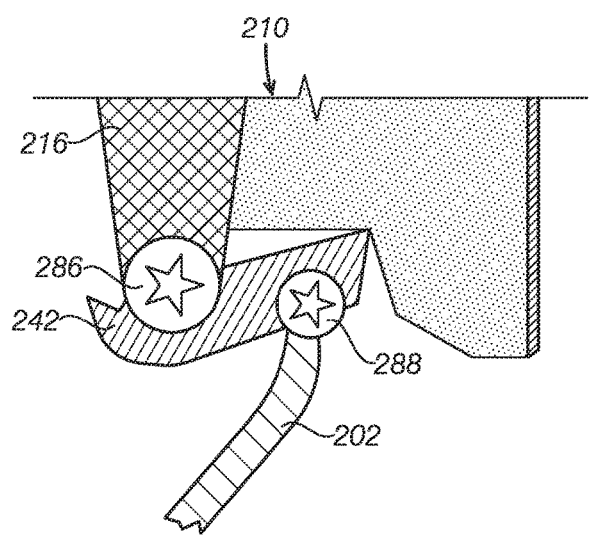
FIG. 13D is a side view of the bracket assembly shown in FIG. 13A depicting the bracket assembly with side bolts.

As can be seen in FIGS. 13C-13D, side fasteners 286, 288 may be used to secure the articulation members together. In the example embodiment, the side fasteners 286 are inserted into the side holes 280 of the rib 216 to be secured into the side holes 282 of the second articulation member 242. Likewise, the side fasteners 288 are inserted into the side holes 284 of the second articulation member to be secured into the side holes 285 of the first articulation member 202. The side fasteners 286, 288 include a smooth surface shoulder 299 so that the articulation members may rotate smoothly to secure the rail trim to the sidewall.

Figure 14:
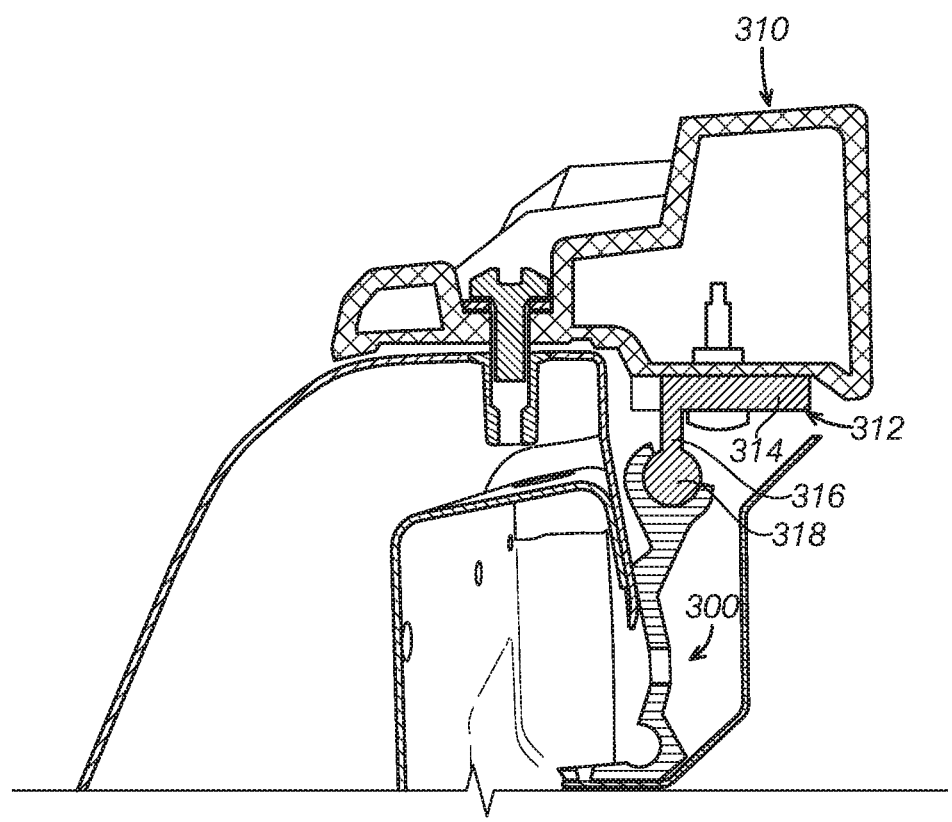
FIG. 14 is a cross sectional view of a rail trim without an integral pivot utilizing a separated piece to create a pivot.

Now turning to FIG. 14, a bracket assembly 300 may include a separate attachment piece 312 to create an attachment point on the rail trim so that it can be used to connect the rail trim with different configurations. For example, the bracket assemblies 300 may be used to connect a rail trim 310 has a closed cross section and formed in a blow mold process. The separated piece 312 may include a base 314 attached to a bottom of the rail trim and a rib 316 extending from the base 314 and including a first pivot 318. The separated piece 312 may be attached to the rail trim 310 with a bolt, screw, or other attachment mechanism.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A bracket assembly to connect a first part and a second part formed with an angle with the first part, comprising
 a first articulation member including:
   a first joint portion having a first pivot connection to be coupled with the first part, and
   a second joint portion having a second pivot connection to be coupled with the second part.

2. The bracket assembly of claim 1, wherein the first joint portion includes a first socket to be connected with a first pivot, and the second joint portion includes a second socket to be connected with a second pivot and opened to a direction different from the first socket.

3. The bracket assembly of claim 2, further comprising a connection plate having the second pivot connected with the second socket.

4. The bracket assembly of claim 2, wherein the first pivot is an integral portion of the first part.

5. The bracket assembly of claim 2, wherein the first pivot is a separated piece to be connected with the first part via a fastener or a heat staking.

6. The bracket assembly of claim 1, further comprising a second articulation member, including:
 a third joint portion to be pivotably connected with the first joint portion of the first articulation member and a fourth joint portion to be connected with a first pivot, wherein pivotable movement between the first and the third joint portions varies a length of the bracket.

7. The bracket assembly of claim 6, wherein the third joint portion of the second articulation member includes a third socket and a fourth socket opened at a direction different from the third socket; and wherein the first joint portion of the first articulation member includes a first head to be connected with the third socket of the second articulation member, and the second joint portion of the first articulation member includes a second socket to be connected with a second pivot and facing the second part at an assembled position.

8. The bracket assembly of claim 7, wherein the first pivot is an integral portion of the first part.

9. The bracket assembly of claim 7, wherein the first pivot is a separated piece to be connected with the first part via a fastener or a heat staking.

10. The bracket assembly of claim 7, further comprising a connection plate having the second pivot connected with the second socket.

11. The bracket assembly of claim 10, wherein the body of the first articulation member has a first through hole and the connection plate has a second through hole aligned with the first through hole to provide a passage for a fastener.

12. A bracket assembly to connect a first part with a second part, comprising:
 a first articulation member to be pivotably connected with the first part and including a first joint portion configured to provide a first pivot connection, and a second joint portion configured to provide a second pivot connection,
 a second articulation member including a third joint portion pivotably connected with the first joint portion of the first articulation member and a fourth joint portion coupled pivotably with the second part, wherein pivotable movement between the first and the third joint portions varies a length of the bracket and a length of the bracket is shorter at an assemble position than a length at an un-assemble position.

13. The bracket assembly of claim 12, wherein the third joint portion of the second articulation member includes a third socket and the fourth joint portion includes a fourth socket opened at a direction different from the third socket; and wherein the first joint portion of the first articulation member includes a first head at one end of a main body of the first articulation member and being connected with the third socket of the second articulation member, and the second joint portion of the first articulation member includes a second socket at another end of the main body of the first articulation member and being connected with a second pivot and facing the second part at an assemble position, and the main body includes a first portion and a second portion bend away from the first portion and the first head is on the second portion, and wherein the first articulation member is longer than the second articulation member at the length direction.

14. A vehicle, comprising:
a load box including a sidewall and a side flange;
a rail trim disposed on a top of the sidewall and including a rib disposed along a lengthwise direction of the rail trim and extending downward from a main body of the rail trim; and
a bracket assembly to connect the rail trim with the sidewall, including:
a first articulation member including a first joint portion configured to provide a first pivot connection, and a second joint portion configured to provide a second pivot connection,
a second articulation member including a third joint portion pivotably connected with the first joint portion of the first articulation member and a fourth joint portion coupled pivotably with the rib of the rail trim, wherein pivotable movement between the first and the third joint portions varies a height of the bracket along a height direction of the sidewall to facilitate an assembling of the rail trim to the sidewall of the load box.

15. The vehicle of claim 14, wherein the third joint portion of the second articulation member includes a third socket and the fourth joint portion of the second articulation member includes a fourth socket opened at a direction different from the third socket; and wherein the first joint portion of the first articulation member includes a first head to be connected with the third socket of the second articulation member, and the second joint portion includes a second socket to be connected with a second pivot and facing the sidewall of the load box at an assembled position.

16. The vehicle of claim 15, wherein the rib of rail trim includes a tip portion with a round cross section to be connected with the fourth joint portion.

17. The vehicle of claim 15, further comprising a pivot roller connected with the rib and the second articulation member.

18. The vehicle of claim 15, wherein the rib includes a slender insert, the pivot roller has a first through hole, and the fourth joint portion of the second articulation member includes a second through hole, and wherein the slender insert is configured to pass the through the first and second holes to enable the connection with the rib and the fourth joint by heat staking.

19. The vehicle of claim 15, wherein the third joint portion of the second articulation member includes a bottom surface and the rail trim includes a lock surface, and wherein the bottom surface and the lock surface are configured to be interference fit at the assembled position.

20. The vehicle of claim 15, wherein the third joint portion of the second articulation member includes a bottom surface, wherein the rail trim includes an inner wall substantially parallel to the rib and an end portion of the inner wall has a clip bended toward the rib, and wherein a bottom surface of the third joint portion snaps fit with the clip at an assembly position.

\* \* \* \* \*